US009932685B2

(12) United States Patent
Halada et al.

(10) Patent No.: US 9,932,685 B2
(45) Date of Patent: Apr. 3, 2018

(54) SYNTHESIS OF PALLADIUM NANOPARTICLES

(71) Applicant: The Research Foundation for the State University of New York, Albany, NY (US)

(72) Inventors: Gary P. Halada, Baiting Hollow, NY (US); Prashant Kumar Jha, Palatine, IL (US); Michael A. Cuiffo, Nesconset, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 490 days.

(21) Appl. No.: 14/375,157

(22) PCT Filed: Feb. 8, 2013

(86) PCT No.: PCT/US2013/025248
§ 371 (c)(1),
(2) Date: Jul. 29, 2014

(87) PCT Pub. No.: WO2013/119889
PCT Pub. Date: Aug. 15, 2013

(65) Prior Publication Data
US 2015/0001088 A1 Jan. 1, 2015

Related U.S. Application Data

(60) Provisional application No. 61/596,952, filed on Feb. 9, 2012.

(51) Int. Cl.
*C25D 13/22* (2006.01)
*C25D 15/00* (2006.01)
(Continued)

(52) U.S. Cl.
CPC ............... *C25D 15/00* (2013.01); *B22F 9/24* (2013.01); *B82Y 40/00* (2013.01); *C25D 13/22* (2013.01);
(Continued)

(58) Field of Classification Search
CPC ........ C25D 15/00; C25D 21/00; C25D 13/22; C25D 15/02; C25C 1/00; C25C 5/02;
(Continued)

(56) References Cited

U.S. PATENT DOCUMENTS 7,883,615 B2   2/2011 Payne et al.
2003/0060873 A1   3/2003 Gertner et al.
(Continued)

FOREIGN PATENT DOCUMENTS

WO      2011106526 A2    9/2011
WO   WO-2011106526 A2 *  9/2011  ............. C25D 13/00

*Primary Examiner* — Ciel P Thomas
(74) *Attorney, Agent, or Firm* — Carter, DeLuca, Farrell & Schmidt, LLP

(57) ABSTRACT

A method of synthesizing metal nanoparticles is provided. The method includes submerging an electrically conductive substrate in a polysaccharide solution containing a predetermined concentration of a metal salt; applying an electric potential between the electrically conductive substrate and the polysaccharide solution for a predetermined period of time to form a polysaccharide layer containing metal nanoparticles on the electrically conductive substrate; re-dissolving the polysaccharide layer in a solvent to form a solution including the polysaccharide and the metal nanoparticles; and separating the metal nanoparticles from the polysaccharide.

19 Claims, 5 Drawing Sheets

(51) Int. Cl.
    *C25D 15/02*     (2006.01)
    *B22F 1/00*     (2006.01)
    *B22F 9/24*     (2006.01)
    *B82Y 40/00*     (2011.01)

(52) U.S. Cl.
    CPC ............ *C25D 15/02* (2013.01); *B22F 1/0018* (2013.01); *B22F 2999/00* (2013.01)

(58) Field of Classification Search
    CPC ......... C25C 7/00; C25C 1/20; A01N 2300/00; B22F 1/0018; B22F 9/24; B22F 2999/00; B82Y 40/00
    See application file for complete search history.

(56) References Cited

U.S. PATENT DOCUMENTS

| | | | | |
|---|---|---|---|---|
| 2006/0068026 | A1* | 3/2006 | Hu | A01N 59/16 |
| | | | | 424/618 |
| 2007/0068824 | A1* | 3/2007 | Payne | C25D 5/022 |
| | | | | 205/317 |
| 2010/0021985 | A1* | 1/2010 | Mason | B82Y 25/00 |
| | | | | 435/174 |
| 2011/0064825 | A1 | 3/2011 | Goia et al. | |
| 2011/0100835 | A1* | 5/2011 | Yoon | B01J 13/0034 |
| | | | | 205/560 |
| 2011/0129536 | A1* | 6/2011 | Donati | C08L 5/08 |
| | | | | 424/488 |
| 2011/0275980 | A1* | 11/2011 | Weber | A61L 29/04 |
| | | | | 604/20 |

\* cited by examiner

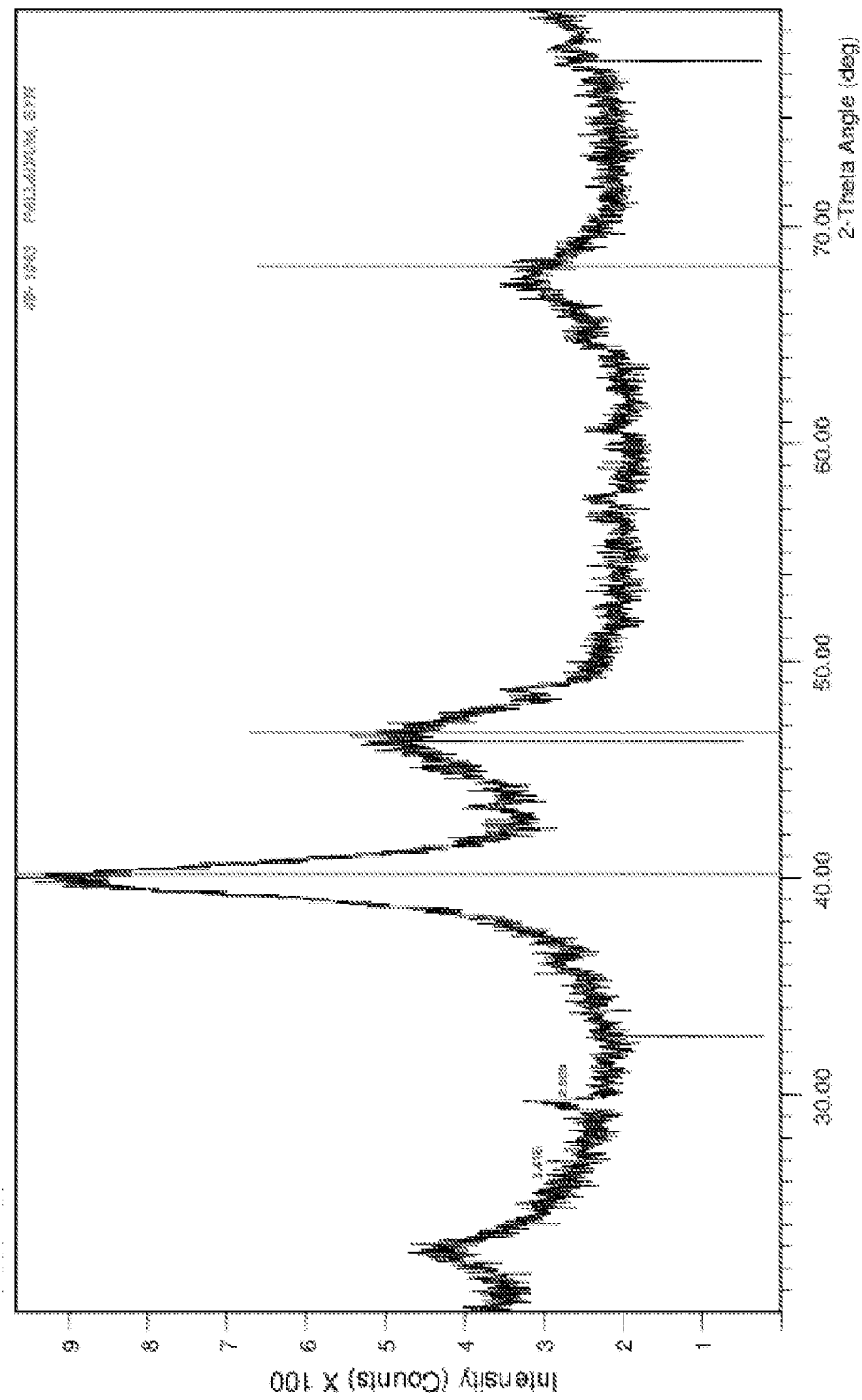
Figure (3) X-ray Diffraction pattern of palladium nano particles

US 9,932,685 B2

SYNTHESIS OF PALLADIUM NANOPARTICLES

CROSS REFERENCE TO RELATED APPLICATIONS

This application claims the benefit of and priority to International Patent Application No. PCT/US2013/025248 filed on Feb. 8, 2013, which, in turn, claims the benefit of, U.S. Provisional Patent Application Ser. No. 61/596,952, filed Feb. 9, 2012, the entire disclosures of each of which are incorporated by reference herein.

BACKGROUND

The present disclosure relates to methods of forming metal nanoparticles and, more particularly, to an electrochemical process for synthesizing palladium nanoparticles.

Metal nanoparticles have been utilized as catalysts for a variety of chemical processing methods, including the conversion of organic compounds in energy generation, as well as use in polymer membrane components of hydrogen fuel cells. For example, metals, such as silver, gold, platinum, and palladium, are used extensively as a catalyst in numerous applications. Advances in nanotechnology have led to efforts to synthesize smaller sized catalyst particles that are robust and show enhanced catalytic activity through increased surface to volume ratio. The successes of these advances in nanotechnology depend on improved performance of nanoparticles as well as cost reduction in their synthesis. Improved economical processes for the production of metal nanoparticles remain desirable.

SUMMARY

The present disclosure provides methods for synthesizing metal nanoparticles, as well as nanoparticles produced by these methods.

In embodiments, a method of synthesizing metal nanoparticles of the present disclosure includes submerging an electrically conductive substrate in a polysaccharide solution containing a predetermined concentration of a metal salt; applying an electric potential between the electrically conductive substrate and the polysaccharide solution for a predetermined period of time to form a polysaccharide layer containing metal nanoparticles on the electrically conductive substrate; dissolving the polysaccharide layer to form a solution including the polysaccharide and the metal nanoparticles; and separating the metal nanoparticles from the polysaccharide.

Metal nanoparticles produced by the methods of the present disclosure are also provided.

BRIEF DESCRIPTION OF THE DRAWINGS

The accompanying drawings, which are incorporated in and constitute a part of this specification, illustrate embodiments of the disclosure and, together with a general description of the disclosure given above, and the detailed description of the embodiment(s) given below, serve to explain the principles of the disclosure, wherein:

FIG. 3 is a graph illustrating X-ray diffraction peaks for a sample of palladium nanoparticles produced according to the present disclosure, confirming the reduction of $Pd^{2+}$ ions.

DETAILED DESCRIPTION

Figure 1A:
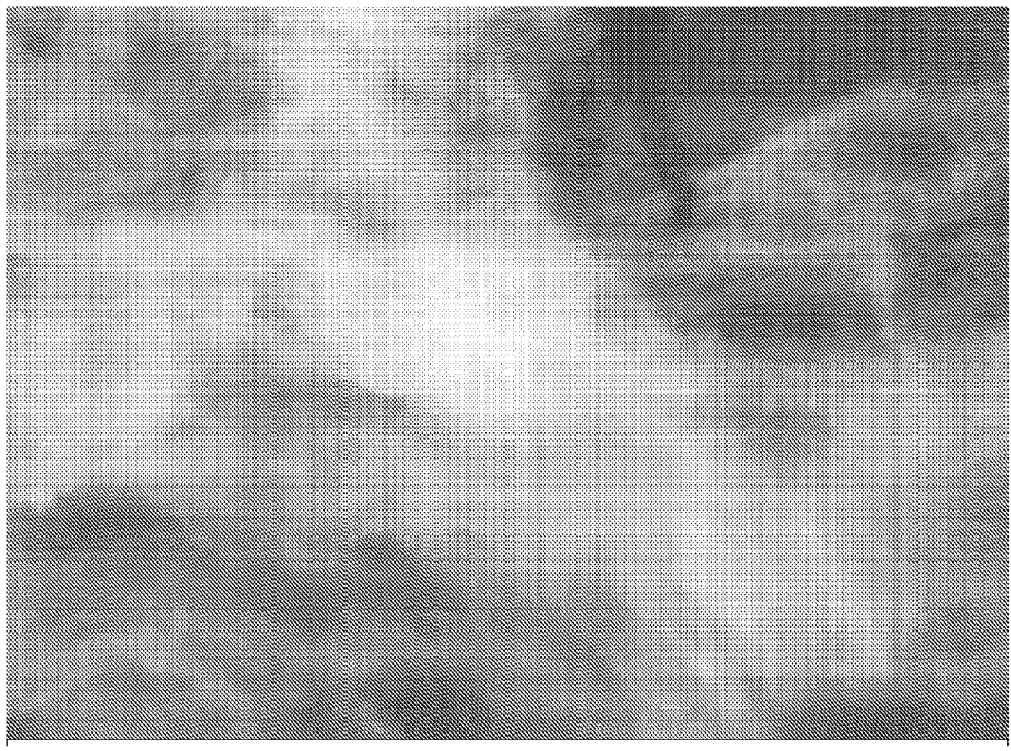
FIG. 1A is a Scanning Electron Microscope image of palladium co-deposited with chitosan according to the present disclosure, showing very small particles in fibrous structure (100,000×)

Methods of producing metal nanoparticles are described herein. The method utilizes an aqueous solution containing a polysaccharide and a metal salt for electrochemical deposition of a polysaccharide film, possessing metal nanoparticles, on an electrically conductive substrate. The method includes applying an electric potential between the electrically conductive substrate and the aqueous solution, to form the nanoparticles thereon. Once formed, the polysaccharide film containing the metal nanoparticles may be removed from the substrate and dissolved to form a solution containing the polysaccharide and metal nanoparticles. The polysaccharide and metal nanoparticles may then be separated using filtration or electrochemical methods.

The polysaccharide utilized with the method of the present disclosure may be capable of solubilizing in a liquid medium and forming or otherwise depositing a polysaccharide layer onto an electrically conductive support under effective reaction conditions. Polysaccharides which may be utilized in accordance with the method of the present disclosure include, for example, chitosan. Suitable chitosan may be of low to high molecular weight, from 3000 to 20,000 Daltons, and a range of deacetylation from 60% to greater than 85%.

In embodiments, the polysaccharide utilized is chitosan. Chitosan is a linear, high molecular weight, crystalline polysaccharide of β-(1→4) linked N-acetyl-D-glucosamine. It is produced by alkaline N-deacetylation of chitin from crustaceans, mollusks, insects, and fungi, and is the second most abundant natural biopolymer after cellulose.

To carry out the processes of the present disclosure, chitosan is dissolved in water or a suitable solvent such as alcohol. The volume of water or other suitable solvent used to form this solution may be from about 10 ml to about 1 liter, in embodiments from about 100 ml to about 200 ml. The amount of chitosan may vary, and can be present in amounts from about 1% to about 50% by weight of the solution, in embodiments from about 2 to about 5% by weight of the solution. In embodiments, the solution may be formed with heating to a temperature from about 10° C. to about 90° C., in embodiments from about 20° C. to about 35° C. The solution may also be formed with mixing at a rate of from about 1 revolutions per minute (rpm) to about 1000 rpm, in embodiments from about 10 rpm to about 200 rpm. The solution may be formed over a period of time from about 1 minute to about 2 days, in embodiments from about 5 minutes to about 5 hours. The resulting chitosan solution may have a pH from about 1 to about 8, in embodiments from about 2 to about 7.

Once formed, the pH of the solution may then be lowered by addition of an acid thereto. Suitable acids include, for example, hydrochloric acid (HCl), hypochlorous acid, or organic acids such as acetic acid, combinations thereof, and the like. The amount of acid added to the solution will depend on the amount of chitosan and solvent utilized to form the solution. The acid may have a molarity (M) from about 0.5 M to about 10 M, in embodiments from about 1 M to about 2 M. In embodiments, the acid may be added to lower the pH of the chitosan solution so that the chitosan solution possesses a pH from about 1 to about 7, in embodiments from about 2 to about 6.

As noted above, a metal salt is added to the chitosan solution. The metal salt is soluble in the chitosan solution and is capable of forming or otherwise delivering metal ions in nanoparticulate form into/onto the polysaccharide layer formed on the substrate. The metal cations of the metal salt of the present disclosure include noble metals, such as silver, palladium, platinum, gold, ruthenium, rhodium, osmium, and iridium, and the salts thereof may include nitrates, chlorides, sulfates, bromides and/or iodides. In embodiments, a combination of metal salts may be added to the polysaccharide solution. The concentration of the metal salt, in terms of molarity (M), may be from about 0.001 M to about 1 M, in embodiments, from about 0.01 M to about 0.1 M, of the chitosan solution.

In embodiments, palladium may be used. Suitable salts for formation of palladium nanoparticles include, for example, palladium nitrate, palladium chloride, palladium bromide, palladium iodide, palladium sulfate, combinations thereof, and the like.

An electrically conductive substrate is then placed in the chitosan solution. Cathodes, sometimes referred to herein as working electrodes, may be made of any suitable material with the purview of one skilled in the art, including stainless steel, gold, platinum, titanium and its alloys. Utilized with the method of present disclosure is non-corrosive and may be formed of stainless steel, gold, platinum, titanium and its alloys, among other electrically conductive materials.

In embodiments, a three electrode system may be added to the chitosan solution, or the chitosan solution may be added to a three electrode cell, the three electrodes including a working electrode as described above, a reference electrode, e.g., an Ag/AgCl electrode, and a counter electrode, such as platinum or other non-corroding conductive metals as above.

The electric potential applied between the polysaccharide solution containing the metal salts and the working electrode, is delivered at a predetermined voltage for a predetermined period of time. The voltage applied may be a negative potential versus Open Circuit Potential (OCP). A negative potential may be from about −0.5 to about −3 volts (V), in embodiments, from about −0.75 to about −2 V, and in some embodiments, from about −1 to about −1.75 V. The predetermined period of time may be from about 5 seconds to about 10 minutes, in embodiments, from about 30 seconds to about 5 minutes, and in some embodiments, from about 45 seconds to about 3 minutes.

On application of the negative potential, a localized zone of high pH is created near the cathode or working electrode. The pH in this localized zone may be from about 6 to about 13, in embodiments from about 7 to about 12. The chitosan present in this localized zone of high pH absorbs electrons, is deprotonated and is deposited on the cathode, thereby forming a hydrogel on the cathode.

The film thus formed on the substrate includes the polysaccharide, in embodiments chitosan, as well as metal nanoparticles derived from the metal salts that were added to the chitosan solution. As noted above, in embodiments the metal nanoparticles may be palladium nanoparticles. Once formed, the hydrogel film and nanoparticles may be removed from the substrate using means within the purview of those skilled in the art. In embodiments, the hydrogel possessing the nanoparticles may be peeled off the working electrode or by first flexing and immersing the electrode in liquid nitrogen and then peeling off the layer and mechanically crushed into a powder for subsequent use.

Once formed, the chitosan film including the metal nanoparticles, in embodiments palladium nanoparticles, may be separated from the stainless steel substrate and redissolved in any suitable solvent or acid. The solvent may be, for example, water, alcohol, combinations thereof, and the like. The acid may be acetic acid, formic acid, propionic acid, butyric acid, isobutyric acid, lactic acid, nitric acid, hydrochloric acid, chloroacetic acid, combinations thereof, and the like. The resulting nanoparticles may be recovered by methods within the purview of those skilled in the art, including, for example, electrochemical methods such as plating, filtration, centrifuging, combinations thereof, and the like.

The ratio of palladium to chitosan is controlled to alter the size and morphology of the palladium nanoparticles in the film. The size of the palladium nanoparticles is dependent upon the operating parameters of the process, such as applied voltage and time. Both parameters are controlled to adjust the size of the nanoparticles formed. Longer times and more negative voltages may result in growth of nanoparticles and aggregation into dendritic structures.

In embodiments, the resulting nanoparticles thus formed, such as palladium nanoparticles, may have a diameter from about 3 nm to about 200 nm, in embodiments from about 15 nm to about 150 nm, in embodiments from about 50 nm to about 125 nm, depending on the materials utilized and reaction conditions as described above.

The metal nanoparticles produced in accordance with the present disclosure have useful applications in a variety of fields, including material synthesis, fuel cells, supercapacitors, and batteries.

In embodiments, the nanoparticles produced in accordance with the present disclosure may be used in fuel cells, and in particular, in the emerging field of alkaline fuel cells. Use of common stainless steel, ubiquitous chitosan, and small amounts of metal salts, along with simple processing, results in significant cost savings over other processes and the process works with chitosan from multiple sources, with varying degrees of deacetylization. The process is rapid, occurring at room temperature, and eliminates the use of hazardous reducing agents to obtain metal nanoparticles. The process is easily adaptable for production of other nanoparticles and different substrates can be used for electrodes. Finally, conformal coatings allow for production of various geometries by allowing for coating on curved and convoluted surfaces, as long as those surfaces are freely exposed to the electrolyte.

The following Examples are provided to illustrate, but not limit, the features of the present disclosure so that those skilled in the art may be better able to practice the features of the disclosure described herein.

EXAMPLE 1

An exemplary method of synthesizing palladium nanoparticles in accordance with the present method will now be discussed.

Initially, 0.23 grams of palladium nitrate was dissolved in an aqueous chitosan solution prepared by dissolving 1.5 grams of low molecular weight chitosan in 120 ml of water.

Hydrochloric acid (HCl), having a molarity (M) of about 1 M, was then added drop wise until all the chitosan was dissolved, which occurred as the solution reached a pH of about 2.

A stainless steel substrate, acting as a working electrode, was submerged into the chitosan solution containing the palladium salt and an electric potential was applied thereto. The open circuit potential was applied in a three electrode configuration by the introduction of a reference electrode, e.g., an Ag/AgCl electrode, and a platinum counter electrode into the chitosan solution containing the working electrode.

The electric potential applied was a negative potential that was equal to or less than −2 volts (V). The potential was applied for about 60 seconds. Hydrogen evolved as a result of electrolysis of water, which increased the pH in the vicinity of the working electrode, inducing deposition of chitosan on the stainless steel substrate as a film, as well as reducing palladium ions (e.g., $Pd^{2+}$, $(PdCl_4)^{2-}$) to metal palladium nanoparticles that were up to about 200 nm in size, in this case from about 10 nm to about 200 nm.

Nanoparticles were recovered by dissolution in 0.1 M acetic acid. Once the particles were recovered, scanning electron micrographs of the particles were obtained by use of a Schottky Field Emission Scanning Electron Microscope equipped with energy dispersive analysis by X-ray (EDAX) detector and software for microanalysis, and with Electron Backscatter Diffraction (EBSD) capabilities for non destructive electron diffraction analysis of bulk samples. The Scanning Electron Microscope images obtained are set forth in FIGS. 1A and 2A (100,000× magnification), and the results of the energy dispersive analysis by X-ray (EDAX) spectroscopy are set forth in FIGS. 1B (for the area shown in FIG. 1A) and 2B (for the area shown in FIG. 2A).

Figure 1B:
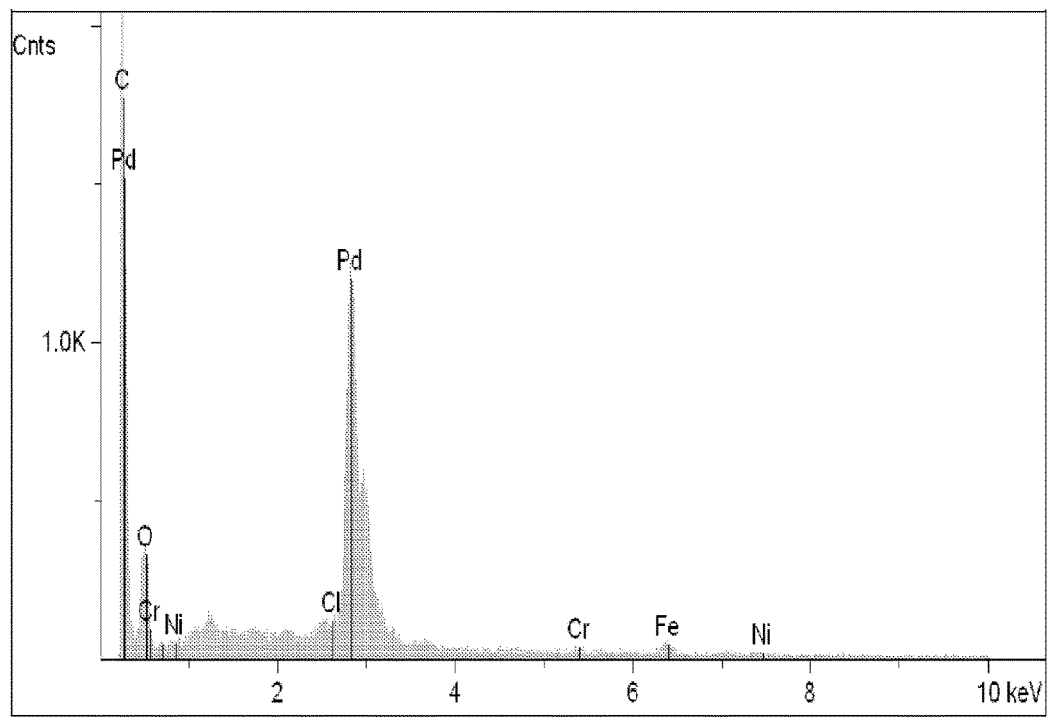
FIG. 1B are the results of energy dispersive analysis by X-ray (EDAX) spectroscopy from the area shown in FIG. 1a, indicating formation of palladium nanoparticles.
Figure 2A:
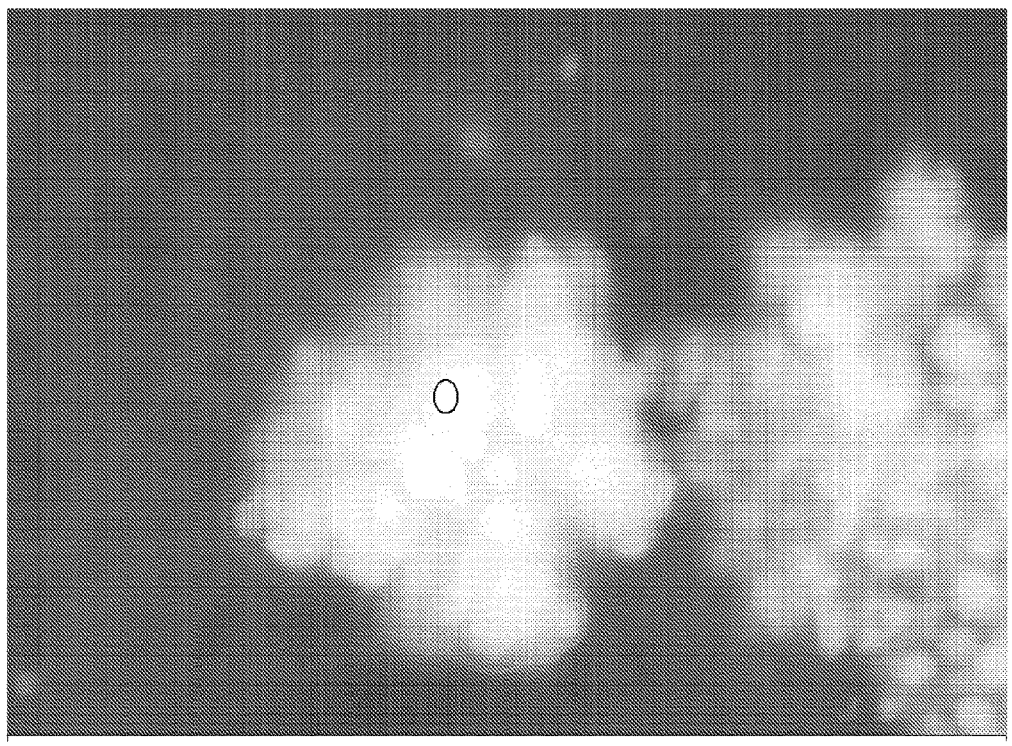
FIG. 2A is a Scanning Electron Microscope image of palladium co-deposited with chitosan according to the present disclosure, showing 25-100 nm particles (100,000 X), FIG. 2B are the results of energy dispersive analysis by X-ray (EDAX) spectroscopy from the area shown in FIG. 2a, indicating formation of palladium nanoparticles.
Figure 2B:
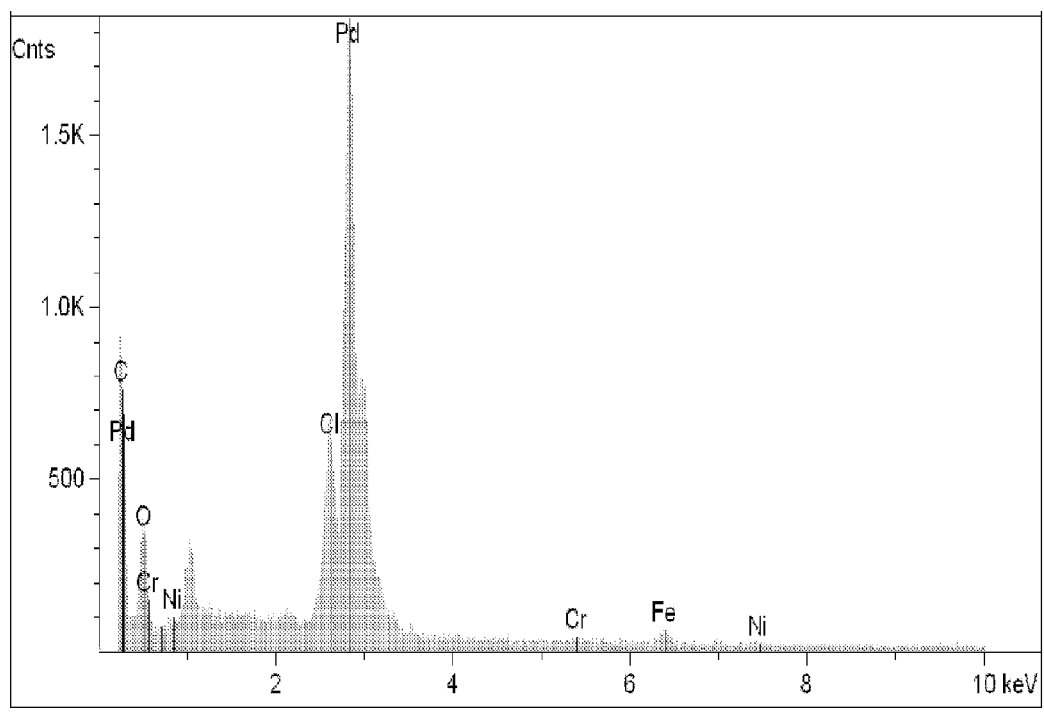

As illustrated in FIGS. 1A, and 2A, the scanning electron microscopic images show a chitosan film with palladium deposition taking place in clusters of small particles (about 5-10 nm) embedded in a fibrous deposition of chitosan, as well as some clusters of larger (25-100 nm) nanoparticles. The energy dispersive analysis by X-ray (EDAX) spectroscopy, as illustrated in FIGS. 1B and 2B (from the areas shown in FIGS. 1A and 2A), demonstrate formation of palladium nanoparticles with particle diameters from less than 10 nm up to 100 nm. These particles had a high surface area to weight ratio, ideal for maximizing the catalytic activity of palladium, e.g., as a fuel cell.

X-ray diffraction of the particles was carried out using a Phillips PW1729 XRD, with a 20 to 80 degree scan and a CuK alpha (1.54184 angstrom) source. FIG. 3 illustrates the X-ray diffraction peaks from the sample of palladium nanoparticles confirming the reduction of $Pd^{2+}$ ions.

Persons skilled in the art will understand that the methods specifically described herein, and illustrated in the accompanying figures, are non-limiting exemplary embodiments. One skilled in the art will appreciate further features and advantages of the disclosed methods based on the above-described embodiments. As such, further modifications and equivalents of the method herein disclosed can occur to persons skilled in the art using no more than routine experimentation, and all such modifications and equivalents are believed to be within the spirit and scope of the disclosure.

What is claimed is:

1. A method of synthesizing metal nanoparticles, the method comprising:
    submerging an electrically conductive substrate in a polysaccharide solution containing a predetermined concentration of a metal salt;
    applying an electric potential between the electrically conductive substrate and the polysaccharide solution for a predetermined period of time to form a polysaccharide layer containing metal nanoparticles on the electrically conductive substrate;
    dissolving the polysaccharide layer to form a solution including the polysaccharide and the metal nanoparticles; and
    separating the metal nanoparticles from the polysaccharide.

2. The method of claim 1, wherein the polysaccharide solution comprises chitosan and a solvent.

3. The method of claim 2, wherein the polysaccharide solution further comprises an acid.

4. The method of claim 1, wherein the metal salt includes noble metal cations selected from the group consisting of silver, palladium, platinum, gold, ruthenium, rhodium, osmium, and iridium.

5. The method of claim 1, wherein the noble metal salt is a palladium metal salt.

6. The method of claim 5, wherein the palladium metal salt is palladium nitrate.

7. The method of claim 5, wherein the palladium metal salt is palladium chloride.

8. The method of claim 1, wherein the predetermined concentration of the metal salt is from about 0.001 M to about 1 M.

9. The method of claim 1, wherein the electrically conductive substrate is stainless steel.

10. The method of claim 1, wherein the electric potential is a negative potential.

11. The method of claim 10, wherein the negative potential is from about −0.5 volts to about −3 volts.

12. The method of claim 1, wherein applying the electric potential further comprises using a three electrode assembly comprising the electrically conductive substrate, an Ag/AgCl reference electrode, and a counter electrode.

13. The method of claim 1, wherein the predetermined period of time is from about 5 seconds to about 10 minutes.

14. The method of claim 1, wherein an acid is used to dissolve the polysaccharide layer to form the solution including the polysaccharide and the metal nanoparticles.

15. The method of claim 1, wherein the separating the metal nanoparticles from the polysaccharide includes filtration of the metal nanoparticles from the polysaccharide.

16. The method of claim 1, wherein the metal nanoparticles have a diameter from about 3 nm to about 200 nm.

17. The method of claim 1, wherein the metal nanoparticles have a diameter from about 15 nm to about 150 nm.

18. The method of claim 1, wherein the metal nanoparticles have a diameter from about 50 nm to about 125 nm.

19. The method of claim 1, further comprising recovering the metal nanoparticles by a method selected from the group consisting of plating, filtration, centrifuging, and combinations thereof.

* * * * *